US007409378B2

(12) United States Patent
Castellani et al.

(10) Patent No.: US 7,409,378 B2
(45) Date of Patent: Aug. 5, 2008

(54) SYSTEM FOR NEGOTIATION USING GRAPHS

(75) Inventors: Stefania Castellani, Meylan (FR); Jean-Marc Andreoli, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1626 days.

(21) Appl. No.: 10/065,491

(22) Filed: Oct. 24, 2002

(65) Prior Publication Data
US 2004/0083186 A1 Apr. 29, 2004

(51) Int. Cl.
G06F 15/00 (2006.01)
G06F 15/18 (2006.01)

(52) U.S. Cl. ...................................... 706/62
(58) Field of Classification Search .............. None
See application file for complete search history.

(56) References Cited

U.S. PATENT DOCUMENTS

| | | | | |
|---|---|---|---|---|
| 5,586,021 A | * | 12/1996 | Fargher et al. | 700/100 |
| 5,826,040 A | * | 10/1998 | Fargher et al. | 705/8 |
| 5,826,239 A | * | 10/1998 | Du et al. | 705/8 |
| 5,826,244 A | | 10/1998 | Huberman | 705/37 |
| 5,924,082 A | | 7/1999 | Silverman et al. | 705/37 |
| 5,953,707 A | * | 9/1999 | Huang et al. | 705/10 |
| 6,088,659 A | * | 7/2000 | Kelley et al. | 702/62 |
| 6,112,189 A | | 8/2000 | Rickard et al. | 705/37 |
| 6,128,773 A | * | 10/2000 | Snider | 717/132 |
| 6,151,582 A | * | 11/2000 | Huang et al. | 705/8 |
| 6,182,055 B1 | | 1/2001 | Kase et al. | 706/10 |
| 6,195,794 B1 | | 2/2001 | Buxton | |
| 6,246,975 B1 | * | 6/2001 | Rivonelli et al. | 703/11 |
| 6,321,133 B1 | * | 11/2001 | Smirnov et al. | 700/100 |
| 6,594,773 B1 | * | 7/2003 | Lisitsa et al. | 713/600 |
| 6,792,615 B1 | | 9/2004 | Rowe et al. | |

(Continued)

FOREIGN PATENT DOCUMENTS

EP 1 074 937 A2 2/2001

OTHER PUBLICATIONS

Managing intellectual property rights in the WWW: patterns and semantics Gil, R.; Tous, R.; Delgado, J.; Automated Production of Cross Media Content for Multi-Channel Distribution, 2005. AXMEDIS 2005. First International Conference on Nov. 30-Dec. 2, 2005 Page(s): 8 pp. Digital Object Identifier 10.1109/AXMEDIS. 2005.30.*

(Continued)

Primary Examiner—Michael B Holmes
(74) Attorney, Agent, or Firm—Fay Sharpe LLP

(57) ABSTRACT

A negotiation is carried out between a plurality of participants. Each participant defines an invocation pattern. A set of coordinator parameters are attached to each invocation pattern, where the set of coordinator parameters define interdependencies between parameters of the plurality of participants that are shared across their invocation patterns. A graph is constructed to carry out the negotiation of a set of actions to be performed by selected ones of the plurality of participants, with nodes of a first node type that represents a negotiating context or a second node type that represents a decision point. The participants construct the graph with primitives instantiated by the invocation patterns. At least one node in the graph is a decision point that merges two or more negotiation contexts into a single decision point. The single decision point combines values of the parameters from the two or more negotiation contexts.

20 Claims, 11 Drawing Sheets

U.S. PATENT DOCUMENTS

| | | | |
|---|---|---|---|
| 6,801,937 B1* | 10/2004 | Novaes et al. | 709/220 |
| 6,842,899 B2* | 1/2005 | Moody et al. | 718/100 |
| 6,859,927 B2* | 2/2005 | Moody et al. | 718/100 |
| 6,882,988 B2* | 4/2005 | Subbu et al. | 706/10 |
| 6,934,684 B2* | 8/2005 | Alpdemir et al. | 704/265 |
| 6,961,943 B2* | 11/2005 | Miller et al. | 719/328 |
| 6,978,244 B2* | 12/2005 | Rovinelli et al. | 705/2 |
| 6,985,722 B1* | 1/2006 | Snelgrove et al. | 455/420 |
| 6,996,843 B1* | 2/2006 | Moran | 726/23 |
| 7,016,882 B2* | 3/2006 | Afeyan et al. | 706/13 |
| 7,024,399 B2* | 4/2006 | Sumner et al. | 706/45 |
| 7,024,589 B2* | 4/2006 | Hartman et al. | 714/32 |
| 7,065,588 B2* | 6/2006 | Konda et al. | 709/246 |
| 7,089,534 B2* | 8/2006 | Hartman et al. | 717/125 |
| 7,107,253 B1* | 9/2006 | Sumner et al. | 706/45 |
| 7,120,646 B2* | 10/2006 | Streepy, Jr. | 707/104.1 |
| 7,170,993 B2* | 1/2007 | Anderson et al. | 379/265.09 |
| 7,206,805 B1* | 4/2007 | McLaughlin, Jr. | 709/203 |
| 7,277,874 B2* | 10/2007 | Sumner et al. | 706/45 |
| 7,290,056 B1* | 10/2007 | McLaughlin, Jr. | 709/230 |
| 2002/0052824 A1 | 5/2002 | Mahanti et al. | |
| 2002/0111922 A1 | 8/2002 | Young et al. | |
| 2002/0116349 A1 | 8/2002 | Batachia et al. | |
| 2002/0147726 A1 | 10/2002 | Yehia et al. | |
| 2003/0069736 A1 | 4/2003 | Koubenski et al. | |
| 2003/0069737 A1 | 4/2003 | Koubenski et al. | |
| 2004/0034848 A1 | 2/2004 | Moore et al. | |
| 2004/0083187 A1 | 4/2004 | Castellani et al. | |
| 2005/0027495 A1 | 2/2005 | Matichuk | |
| 2005/0108036 A1 | 5/2005 | Andreoli et al. | |

OTHER PUBLICATIONS

Agha, G. et al. "A foundation for actor computation", in Journal of Functinal Programming, 7(1): 1-72, 1997.

Aksit, M et al. "Abstracting object interactions using composition filters", in R.Gerraoui, O. Nierstrasz, and M.Riveille, editors, Object Based Distributed Processing. Springer Verlag, 1994.

Andreoli, Jean-Marc et al. "AllianceNet: Information Sharing, Negotiation and Decision-Making for Distributed Organizations," in Proceedings of EC-Web 2000, London, U.K. 2000.

Andreoli, Jean-Marc et al. "CLF/Mekano: a Framework for Building Virtual-Entreprise Applications," in Proceedings of EDOC'99, Manheim, Germany, 1999.

Andreoli, Jean-Marc et al. "Towards a Flexible Middleware Negotiation Facility for Distributed Components", in Proceedings of DEXA "E-Negotiations" workshop, Munich, Sep. 5, 2001.

Andreoli, Jean-Marc et al. "Multiparty Negotiation for Dynamic Distributed Components", in Journal of Science of Computer Programming, 31(2-3):179-203, 1998.

C. Berge. "Graphs and hypergraphs", in North-Holland Publishing Company, Amsterdam, Inc., 1973, Chapter 17, pp. 389-413.

W. Emmerich, "Software Engineering and Middleware: A Roadmap", in Proceedings of ICSE 2000, The future of Software Engineering, Munich, Germany, 2000.

J-Y. Girard, "Linear logic", in Theoretical Computer Science, 50:1-102, 1987.

McConnell, Stephen et al. "Negotiation Facility," OMG final revised submission for a CORBA service, 1999.

Yellin et al. "Protocol specifications and component adaptors", in ACM Transactions on Programming Languages and Systems, 19(2): 292-333, 1997.

Andreoli, Jean-Marc et al., "Augmenting Offices With Ubiquitous Sensing", in Proc. of Smart Object Conference, Grenoble, 2003.

Andreoli, Jean-Mark et al., "Negotiation as a Generic Component Primitive", in Proc. of Distributed Application and Interoperable Systems, Paris, France, 2003.

Andreoli, Jean-Marc et al., "Ubiquitous Negotiation Games: A Case Study", in Proc. of DEXA "e-negotiations" Workshop, Prague, Czech Republic, 2003.

Bichler, M. et al., "Towards, a Structured Design of Electronic Negotiations", in Group Decision and Negotiation Journal, 12(4):311-335, 2003 (early version InterNeg Research Papers INR Jul. 2002).

Castellani, S. et al., "E-Alliance: A Negotiation Infrastructure for Virtual Alliances" in Group Decision and Negotiation Journal, 12(2):127-141,2003.

Chen, Y., "Arc Consistency Revisted", in Information Processing Letters, 70:175-184, 1999.

Jung et al., "Argumentation as distributed constraint satisfaction; applications and results", published in Proceedings of International Conference on autonomous Agents, pp. 324-331, Montreal, QB, Canada.

Mackworth, A., "Constraint Satisfaction", in Shapiro, S. (Eds.), Encyclopedia of Artificial Intelligence ($2^{nd}$ ed.), John Wiley and Sons (pp. 285-293), 1992.

Montanari, U., "Networks of Constraints: Fundamental Properties and Applications to Picture Processing", in Information Science, 7, pp. 95-132, 1974.

Nelson, G. et al., "Simplification by Cooperating Decision Procedures", in ACM Transactions on Programming Languages and Systems, 1(2):245-257, 1979.

Shostak, R., "A Practical Decision Procedure for Arithmetic with Function Symbols", in Journal of the ACM, 26(2):351-360, 1979.

Sierra et al., "A framework for augumentation-based negotiation", published in Singh et al., editors, Intelligent Agents IV:Agent Theories, Architectures, and Languages, vol. 1365 of Lecture Notes in Computer Science, p. 177-192, Springer Veriag, 1998.

Yokoo, M. et al., "Algorithms for Distributed Constraint Satisfaction: A Review", in Autonomous Agents and Multi-Agent Systems, 3(2):185-207,2000.

* cited by examiner

SYSTEM FOR NEGOTIATION USING GRAPHS

CROSS REFERENCE TO RELATED APPLICATIONS

Cross-reference is made to U.S. patent application entitled "System For Negotiation With Mirroring", by Jean-Marc Andreoli et al., which is assigned to the same assignee as the present invention and incorporated herein by reference.

BACKGROUND OF INVENTION

The present invention relates generally to a negotiation mechanism, and more particularly, to a method and apparatus for negotiating performance of a set of actions by a plurality of participants in the negotiation.

Negotiation is a pervasive aspect of everyday life, and it is not surprising that various approaches have been proposed to use computer software to support some forms of negotiation processes in various applications. In particular, existing multi-agent systems support negotiations in meeting scheduling, electronic trading, service matching and many other collaborative applications. More generic forms of negotiation also exist in service discovery mechanisms, advanced transaction models, quality of service selection etc.

While most of these forms of negotiation make sense in the context of the applications for which they have been designed, they are difficult to transport across applications, and across architectural layers within an application. In other words, there is no satisfactory generic model of negotiation that could provide the basis of a middleware tool that any distributed application could rely on at multiple levels.

Middleware systems are programs that provide "glue" for programmatically coupling various components of a distributed program. Such systems are gaining momentum, following the extensive use of the Internet and intranets, because they try to address recurrent needs of distributed application development, such as in the domain of electronic commerce. In addition, middleware is evolving towards the role of an "integration tool" for coordinating users and applications.

One example of a middleware system is CLF (Coordination Language Facility) developed by Xerox Corporation. CLF is a lightweight coordination middleware toolkit designed to integrate discovery, transaction and notification aspects in distributed component systems. Aspects of CLF are described by: J-M. Andreoli et al., in "Multiparty Negotiation for Dynamic Distributed Object Services", published in Journal of Science of Computer Programming, 31(2-3):179-203, 1998; J-M. Andreoli et al., in "CLF/Mekano: a Framework for Building Virtual-Enterprise Applications", published in Proc. of EDOC'99, Manheim, Germany, 1999; and J-M. Andreoli and S. Castellani, in "Towards a Flexible Middleware Negotiation Facility for Distributed Components", published in Proc. of DEXA 2000 e-Negotiations Workshop, Munich, Germany, 2001.

While existing middleware systems currently provide some form of support for network communication, coordination, reliability, scalability, and heterogeneity, they however currently: do not scale well beyond local area networks, are not adapted to new forms of networking (e.g. wireless or hybrid), and are not always dependable nor flexible enough to provide generic negotiation capabilities. Some improvements provide large scale distribution, adaptive reconfigurability and support for mobility as described by W. Emmerich, entitled "Software Engineering and Middleware: A Roadmap", published in Proc. of ICSE 2000, The future of Software Engineering, Munich, Germany, 2001.

Most computing models, however, are not able to support the processing of partial and contextual information, which are important ingredients of negotiation. Indeed, a negotiation decision is always taken in the context of previous decisions that limit its scope of validity, and each decision brings only a partial contribution to the final agreement. In the computing models adopted by most middleware systems (e.g., CLF), it is up to the application programmer to manage partial and contextual information (i.e., to treat two separate values as partial information about the same negotiation, and to keep track of the context of all the decisions that have been made to reach a certain value in a negotiation).

There exists, however, one paradigm that naturally supports both partial and contextual information: constraint programming, and in particular, its (concurrent) logic-programming flavor. In constraint programming, a constraint is a piece of partial information about some entities, and constraints can be gathered into constraint stores which may be non-deterministically and incrementally evolving (typically in a search procedure), each state of the store providing the context for further constraint propagations.

Based on constraint programming concepts, it would be advantageous to provide a new, generic model of negotiation that is independent of any application domain, thus qualifying as foundation for a middleware service, but that also avoids overgeneralization where a negotiation is viewed as any process performing transitions through a state graph, triggered by external actions.

SUMMARY OF INVENTION

In accordance with the invention, there is provided a method, and system therefor, for carrying out a negotiation between a plurality of participants. An invocation pattern for each participant is defined, where each invocation pattern is a tuple having at least a name and a set of parameters. A set of coordinator parameters are attached to each invocation pattern, where the set of coordinator parameters define interdependencies between parameters of the plurality of participants that are shared across their invocation patterns.

A graph is constructed to carry out the negotiation of a set of actions to be performed by selected ones of the plurality of participants. The graph is constructed with nodes of one of a first node type that represents a negotiating context and a second node type that represents a decision point. The participants construct the graph with primitives instantiated by the invocation patterns that are used to negotiate values of parameters. At least one node in the graph is a decision point that merges two or more negotiation contexts into a single decision point. The single decision point combines values of the parameters from the two or more negotiation contexts.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
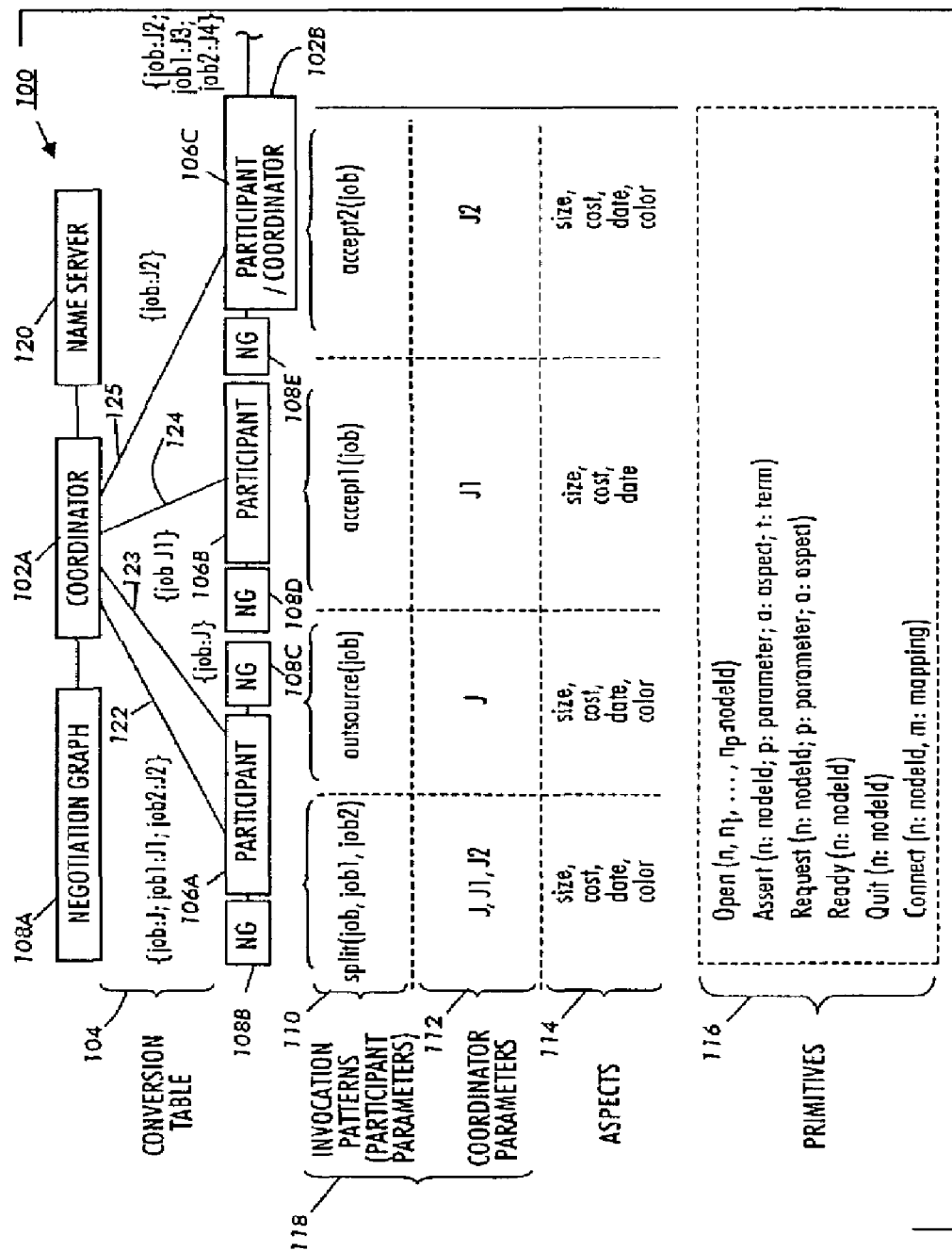
FIG. 1 illustrates an example operating environment for carrying out a negotiation in accordance with the present invention.

FIG. 1 illustrates an example operating environment 100 for carrying out a negotiation in accordance with the present invention. The operating environment includes a set of two or more participants 106 and a set of one or more coordinators 102. The example shown in FIG. 1 illustrates three participants 106A, 106B, and 106C and two coordinators 102A and 102B. The participants 106 and coordinator(s) 102 are autonomous programs that may operate on one or more computational machines that are communicatively coupled using networks such as the Internet or an intranet.

A computational machine (i.e., system) includes negotiation processing instructions for performing a negotiation in accordance with the invention. Each computation machine may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof.

Each coordinator 102 carries out a negotiation by communicating with a set of participants 106 using a conversion table 104 that provides a mapping between negotiation graphs 108. FIG. 1 shows negotiation graphs 108A, 108B, 108C, 108D, and 108E. Each participant has one negotiation graph for each invocation pattern. For example, the participant 106A has two negotiation graphs 108B and 108C, corresponding to invocation patterns split( ) and outsource( ), respectively. During the negotiation, the participants 106 reach an agreement as to a set of actions to be performed by each of them. These actions are defined by their invocation patterns.

Each invocation pattern 110 is an external description of what actions each participant can perform (i.e., an interface). An invocation pattern 110, however, does not constrain the implementation of actions that a participant may perform. Instead, an invocation pattern constrains the way such actions are made visible to other computational machines. That is, an invocation pattern is an external name for an ongoing internal action. More formally, an invocation pattern is a tuple consisting of an invocation name and a set of participant named parameters. Each tuple is an ordered collection of typed data objects or place holders, called elements.

Each participant parameter of an invocation pattern 110 is attached a coordinator parameter 112. The coordinator parameters 112 define interdependencies between the plurality of participants that are shared across invocation patterns 110. Invocation patterns 110 with coordinator parameters 112 are referred to herein as an "invocation" 118. That is, invocations 118 are obtained by assigning coordinator parameters 112 to invocation patterns 110. Each coordinator parameter 112 has properties that describe aspects 114 of its value. Each aspect has a value or a constraint on a range of values.

The participants 106 carry out a negotiation by collaboratively building their respective negotiation graphs 108 using a protocol defined by a set of primitives 116 that are instantiated by the invocation patterns 110. Each participant 106 in a negotiation only views its negotiation graph and acts upon it or has it acted upon through its set of primitives 116 instantiated by its invocation pattern.

The combination of invocations 118 of the participants 106 defines a negotiation problem statement to which a solution is negotiated using the coordinator 102. The role of the coordinator parameters in a negotiation problem statement is to capture interdependencies between the invocation patterns 110 to be realized through actions by each of the participants 106.

B. Negotiation Graphs

A negotiation process is defined in order to arrive at a solution to the negotiation problem statement 118. The negotiation process consists of a set of decisions made by the individual participants 106 in the negotiation. During the negotiation, each participant 106 may explore several alternatives in a decision by characterizing multiple negotiation contexts with different combinations of choices at the decision points where alternatives are explored. In addition, each decision by a participant 106, whether it involves alternatives or not, is made on the basis of information found in one or more negotiation contexts, and applies only to a virtual context representing the fusion of these contexts.

Figure 2:
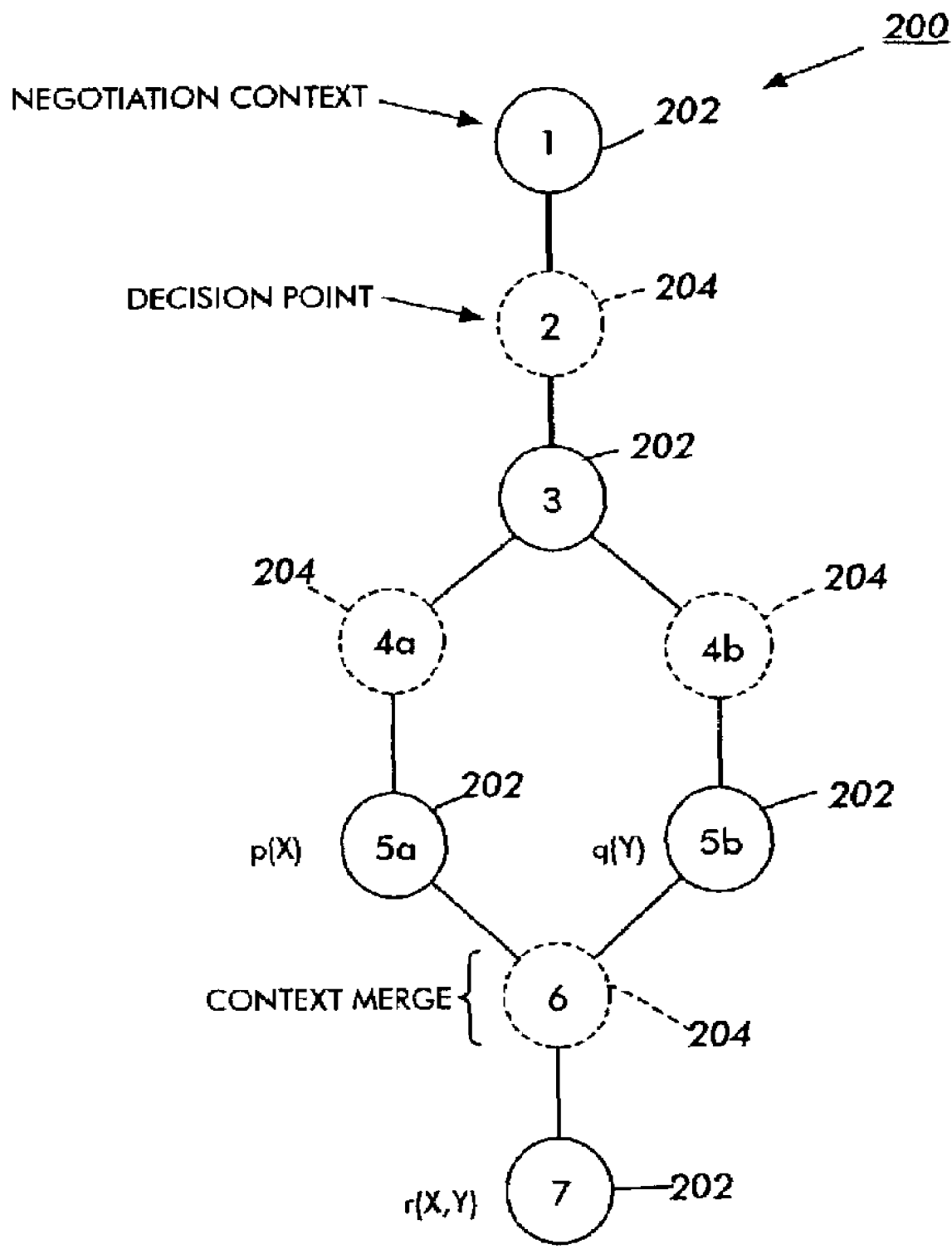
FIG. 2 illustrates an example negotiation graph, which is used to capture the overall state of a negotiation.

FIG. 2 illustrates an example negotiation graph 200, which is used to capture the overall state of a negotiation. The graph 200 is a "bi-colored" graph or more generally a graph with two types of nodes: the first type of nodes or white nodes 202 (i.e., circles with solid lines) represent negotiation contexts and the second type of nodes or black nodes 204 (i.e., circles with dashed lines) represent decision points with alternatives.

In general, each negotiation graph must be directed and acyclic. Each black node 204 (i.e., decision point) in the negotiation graph 200 has one or more parent nodes that must all be white nodes 202 (i.e., negotiation context). That is, the relationship between a black node 204 and its parent white node 202 may be non-exclusive (e.g., between child black nodes 4a and 4b and white parent nodes 3 or between child black node 6 and parent white nodes 5a and 5b). The context in which the decision represented by a decision point 204 is given by the fusion of all its parent white nodes 202.

Each white node 202 (i.e., negotiation context) in the negotiation graph 200 has one or no parent node that must be black nodes 204 (i.e., decision point). That is, the relationship between a white node 202 and its parent black node 204 is exclusive (e.g., between child white node 3 and parent black node 2). The context represented by a negotiation context 202 captures one alternative in the decision expressed by its parent black node 204. A white node 202 without a parent node represents a context that is not the result of a decision (e.g., root node 1—typically, the initial context of a negotiation).

The negotiation graphs as defined herein are based on the structure of proof-nets as described by J-Y Girard in "Linear logic, Theoretical Computer Science", 50:1-102, 1987, which is incorporated herein by reference. Proof-nets are a powerful, desequentialized representation of the resource conscious proofs of Linear Logic. They involve two types of "links", called positive and negative links, which correspond to black and white nodes, respectively. In addition, they very naturally capture dependencies in resource manipulations as more fully described by Andreoli in "Focusing Proof-Net Construction As A Middleware Paradigm" CADE, pp. 501-516, July, 2002, which is incorporated herein by reference.

To make decisions in an informed way, the participants 106 must have access to the information available at each negotiation context about the state of the negotiation in that context. Such information consists of pairs composed of an aspect 114 on a parameter and a property on its value. For example, such a pair could be J·cost<20 (where the aspect on the parameter is "cost" and the property constraining its value is <20), meaning that the cost of the job J should not exceed a certain threshold (20). Consequently, each white node 202 is labeled with specific information about the negotiation at that node in the form of the pairs: aspect on a parameter and property constraining the aspect's value. The overall information available at each white node 202 is thus given by the set of aspects on parameters attached to that node and to all its ancestor white nodes.

Note that a negotiation graph should satisfy some internal topological consistency criterion, ensuring for example that no context depends simultaneously on different alternatives of a decision point. Thus, the criterion should state that any two paths in the graph following distinct alternatives from a given black node 204 cannot later meet into another black node 204. Note that proof-nets in Linear Logic also attempt to define this kind of topological criterions for their correctness. Complete criterions are available for various fragments of the logic, such as the so-called multiplicative fragment, in which the semantics of the outgoing edges of positive links (i.e., black nodes) is different from the negotiation graph 200. The semantics of the negotiation graph 200 corresponds to the additive fragment for which no satisfactory complete criterion exists.

Compared to decision trees, the negotiation graph 200 has two major differences. First, the topological constraints on the negotiation graph 200 do not restrict it to be a tree. That is, one or more negotiation contexts (e.g., negotiation contexts 5a and 5b) may merge to a new decision point (e.g., decision point 6). Second, the edges of the negotiation graph 200 do not hold any information. Instead, information is held at the negotiation contexts 202. Similar to the differences between Linear Logic proof-nets and sequent proofs, graphs, unlike trees, provide the means to avoid arbitrarily sequential inferences (in Logic) or decisions (in negotiations) when they are simultaneously needed but do not depend on each other.

In addition, it will be appreciated that a bi-colored graph is just one embodiment for representing the topological structure of negotiations using graphs. In an alternate embodiment, black nodes (i.e., decision point) can be replaced by hyper-arcs that are amenable to similar treatment. Hyper-arcs are described in more detail by C. Berge in "Graphs and Hypergraphs", published by North-Holland Publishing Company, Amsterdam, Inc., 1973, which is incorporated herein by reference.

C. Negotiation Primitives

As set forth above, participants 106 solving a negotiation problem statement 118 do so by collaboratively building their respective negotiation graphs 108 using a protocol defined by a set of primitives 116 that are instantiated by the invocation patterns 110. This provides each participant (and coordinator) in a negotiation with a view of its graph, which can be acted upon through the set of primitives 116: Assert( ); Open( ); Request( ); Ready( ); Quit( ); and Connect( ).

The primitive Assert(n:nodeId, p:parameter, a:aspect, t:term) expresses the decision that, in the negotiation context represented by node "n" in the graph, the value of parameter "p" must have the property expressed by term "t" pertaining to aspect "a". Node "n" must exist and be white. In this way, negotiation context nodes are populated with information about the negotiation state at these nodes, for all participants to see (and eventually react).

The primitive Open(n,$n_1$,$n_2$, . . . ,$n_p$:nodeId) creates a node n (which must not already exist) and opens directed edges from nodes "$n_1$,$n_2$, . . . ,$n_p$" (which must exist) to node "n". All the parent nodes "$n_1$,$n_2$, . . . ,$n_p$" (if any) must be of the same color, and "n" is then of the opposite color. If p=0 then "n" white (creation of a negotiation root context) and if p≧2 then "n" is black, hence "$n_1$,$n_2$, . . . ,$n_p$" must (all) be white (fusion or merging of negotiation contexts).

While the primitives Assert( ) and Open( ) are sufficient for each participant to effectively build a negotiation graph, they do not allow a participant to influence the other participants decisions, and in particular to induce them to assert enough information for the negotiation to proceed (i.e., the "cold-start" problem).

The primitive Request(n:nodeId, p:parameter, a:aspect) expresses that, to proceed with a negotiation, a participant (or a coordinator) needs to obtain information, through assertions made using the Assert( ) primitive by other participants, about a particular aspect "a" of a parameter "p" at node "n" (which must exist and be white).

In addition, the primitives Ready( ) and Quit( ) provide, respectively, mechanisms for contexts to be detected in which an agreement has been reached or will never be reached because a participant has given up. More specifically, the primitive Ready (n:nodeId) expresses that a participant is satisfied with the state of the negotiation at node "n" (which must exist and be white). In other words, the participant has enough information at node "n" and is ready to assign an action to its invocation pattern. The primitive Quit(n:nodeId) expresses that a participant does not wish to pursue the negotiation in the context at node "n" (which must exist and be white).

A further primitive Connect( ) allows a coordinator 102 to provide each participant with a negotiation graph 108 to begin building. That is, the primitive Connect (n:nodeId; m:mapping) is used by the coordinator 102 to inform a participant 106, through one of its invocation patterns, that it is involved in a negotiation whose root node is "n" and with coordinator parameters attached to the participant parameters according to mapping "m".

D. Partial Mirroring Of Negotiation Graphs

As the participants 106 build their negotiation graph(s) 108, starting from a root node and invoking, in the coordinator 102, the primitives 116, each participant must be informed of the other participants actions on their graph. Exploiting the information given by the primitive Request( ), the coordinator 102 may partially mirror its negotiation graph 108 at each participant 106.

Using the primitive Request( ), each participant 106 may explicitly request to see in its negotiation graph(s) 108 certain aspects (and their properties) 114 of coordinator parameters 112 that have been decided (i.e., negotiated). For example, the participant 106B is interested only in the aspects size, cost, and date of a job while the participant 106C is interested in the aspects size, cost, date, and color of a job.

In accordance with one embodiment of partial mirroring, each time the coordinator 102 changes its negotiation graph upon the action of one of the participants 106, the coordinator 102 informs all other concerned participants of the modification. This embodiment for partially mirroring negotiation graphs considers both asymmetric and symmetric cases. In the asymmetric case, a master copy of the negotiation graph resides in one dedicated component such as the coordinator 102A and is partially replicated in the participants 106A, 106B, and 106C.

In the symmetric case, a network of negotiation graphs, together with a binary, symmetric, acyclic relation (called a "neighborhood") between negotiation graphs is defined. For the example negotiation shown in FIG. 1, the coordinator 102A with participants 106A, 106B, and 106C defines a first neighborhood with negotiation graphs 108A, 108B, 108C, 108D, and 108E and the coordinator 102B with its participants (not shown) defines a second neighborhood with their negotiation graphs (not shown), where each neighborhood has at least two participants and at least one coordinator. For each negotiation there is exactly one coordinator that is not a participant. However, there may be more than one coordinator; each participant in a negotiation may in turn be a coordinator as well (e.g., participant-coordinator 106-C102B) and create its own neighborhood of negotiation graphs.

In either the asymmetric or symmetric case, a link between each two neighboring graphs is labeled with a conversion (i.e., translation) table 104 that maps some of the parameter names used in one graph into some of the parameter names used in the other graph. For example, as shown in FIG. 1, the link 124 between the participant 106B and the coordinator 102A is labeled with the conversion table {job:J1}. More generally, if G and G' are two graphs, then the conversion table from G to G' is written as conversion table $T(G,G')$, where $T(G',G)$ is equal to $T(G,G')^{-1}$. Such a mapping is used to capture the variable sharing constraints in the negotiation problem statement 118. The coordinator parameters 112, the parameter names of the coordinator itself, are converted to and from the parameter names of each invocation in the problem statement.

Each negotiation graph in a network of negotiation graphs can be modified directly by the component (e.g., coordinator or participant) that holds it. This partial mirroring method assures that modifications that are made in one negotiation graph are systematically replicated to only its relevant neighbors. The method takes into account the possible conversion of parameter names, so that, by cascading effect, all the graphs in the network are assured to be partial replicas of each other.

The advantage of this partial mirroring method is that the number of graphs to mirror need not be fixed in advance, and new graphs may join in the mirroring, by selecting a neighbor, at any time. The negotiation problem can thus be dynamically refined. For example, the participant 106C can decide at any time, to also be the coordinator 102B and begin a negotiation for the splitting of job J2 into jobs J3 and J4.

The partial mirroring method never needs to directly mirror the primitive Open( ) that modifies only the topology of a graph in a network of negotiation graphs. Such an operation is treated locally, by adding a node and edge(s), but need not be mirrored as long as no information is attached to the newly created node, as illustrated and described in further detail below. In accordance with the partial mirroring method, mirroring of the topology takes place only when the primitives Request( ) and Assert( ) are performed at one node of one graph in the network.

When the primitive Request( ) is invoked on a negotiation graph "G" either by a neighbor $G_0$ (as an effect of mirroring) or by the component which holds G (let $G_0=G$ in that case) the following three actions are performed. First, the Request is memorized, as well as its originator $G_0$. Second, the Request is replicated at all the neighbors G for which it is relevant. Thus, node "n" and all its ancestors are replicated on all the neighbors G' of G such that $G' \neq G_0$ and "p" is in the domain of the conversion table $T(G,G')$. Then, the primitive Request(n, $T(G,G')(p),a$) is invoked on each such G' (with G being the originator of this Request). Third, if $G_0 \neq G$, then each Assert memorized in G and assigning a term "t" to aspect "a" of "p" at a node "n'" which is either an ancestor or a descendant of "n" is replicated on $G_0$. Thus, node "n'" and its ancestors are first replicated on $G_0$, then the primitive Assert(n',$T(g,G_0)$(p),a,t) is invoked in $G_0$ with G being the originator of this Assert.

When the primitive Assert( ) is invoked on a graph G either by a neighbor $G_0$ (as an effect of mirroring) or by the component which holds G (let $G_0=G$ in that case) the following two actions are performed. First, the Assert is memorized, as well as its originator $G_0$. Second, for each Request memorized in G and pertaining to aspect "a" of "p" at a node "n'", which is either an ancestor or a descendant of "n", the Assert is replicated on the originator of the Request. Thus, if the Request came from a graph G', then n' and all its ancestors are replicated on G', and then Assert(n',$T(G,G')(p),a,t$) is invoked in G' (with G being the originator of this Assert).

This embodiment for partially mirroring negotiation graphs assumes an actor-like model in which messages with the primitives Assert( ) and Request( ) are treated sequentially. The processing order of messages is unimportant, but each message must be fully processed before the next message is processed. Recursive calls to the primitives Assert( ) or Request( ) during the processing of these messages are assumed to be asynchronous (non-blocking), so the processing of a message can never enter a loop and always terminates. Note that this implementation may result in the same Assert( ) message being mirrored several times in the same graph. This can be avoided by attaching to each Assert( ) message a list of "presence" (i.e., of neighboring graphs where the Assert( ) primitive has already been mirrored). An actor-like model is further described by G. Agha, I. Mason, S. Smith, and C. Talcott in "A Foundation For Actor Computation", published in Journal of Functional Programming, 7(1):1-72, 1997, which is incorporated herein by reference.

Figure 3A:
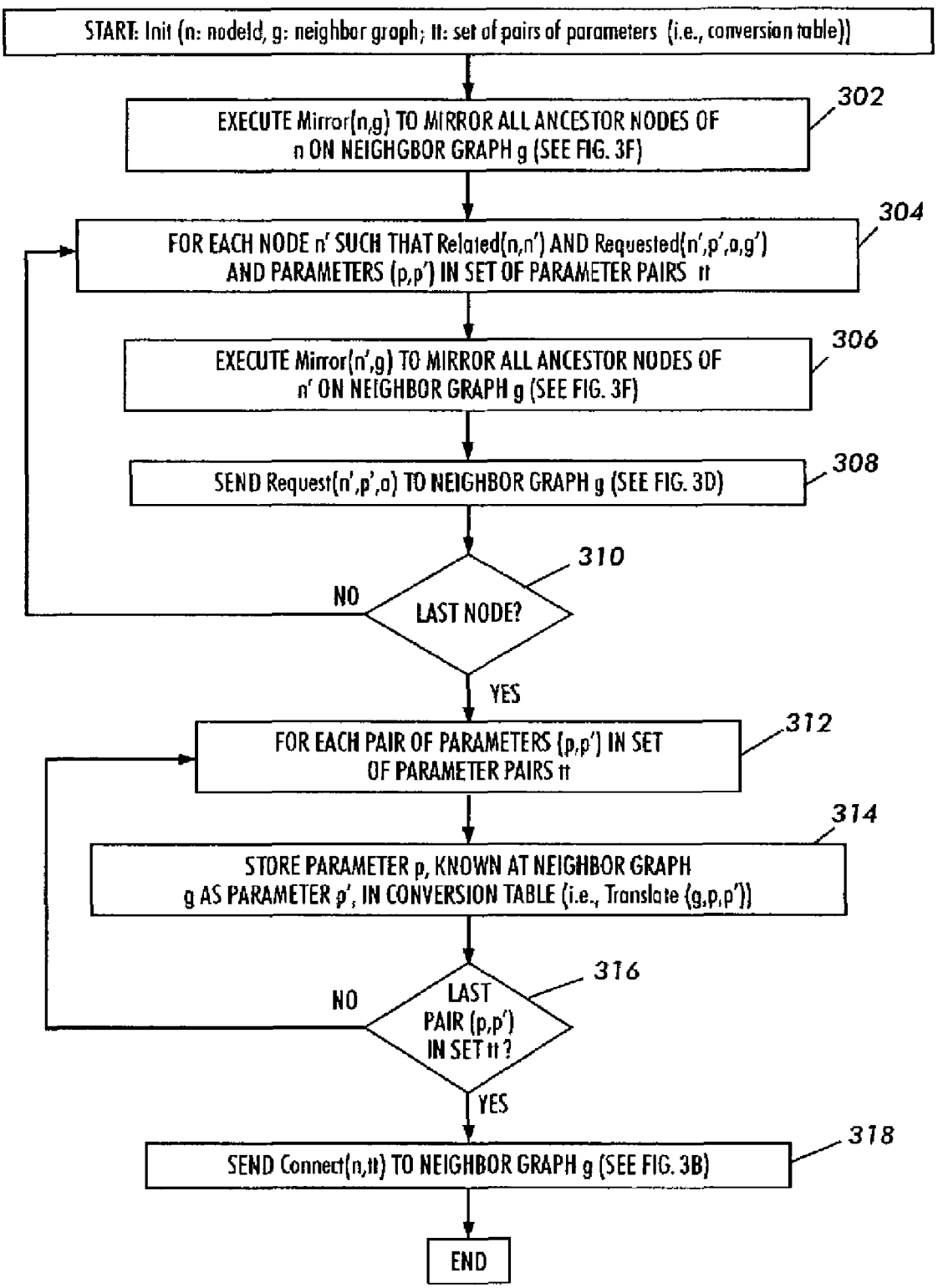
FIGS. 3A-3F set forth flow diagrams for performing partial mirroring of negotiation graphs in accordance with one embodiment of the present invention.
Figure 3B:
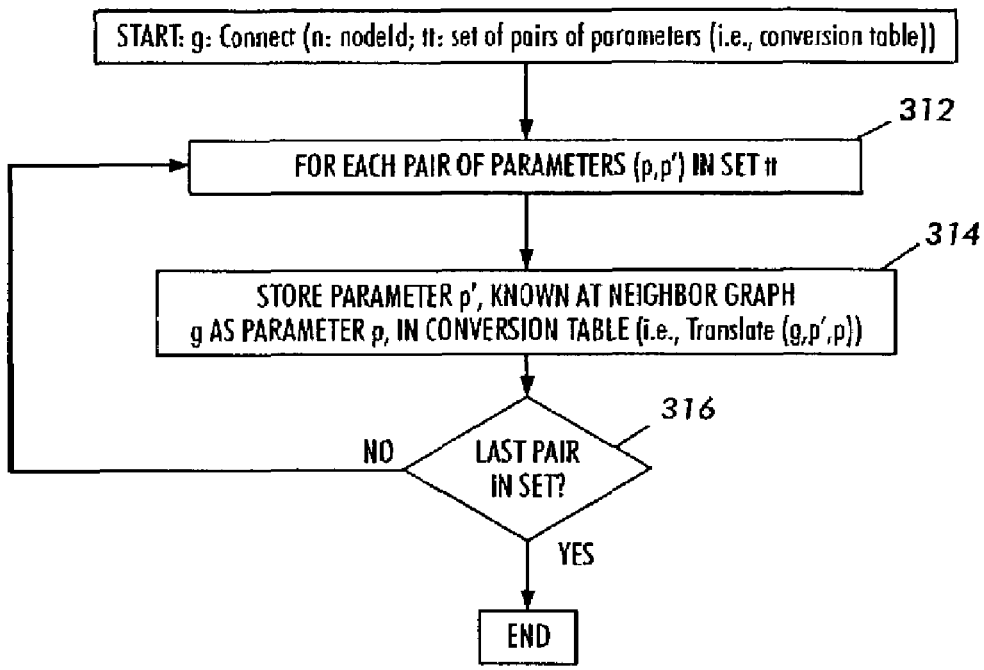
Figure 3C:
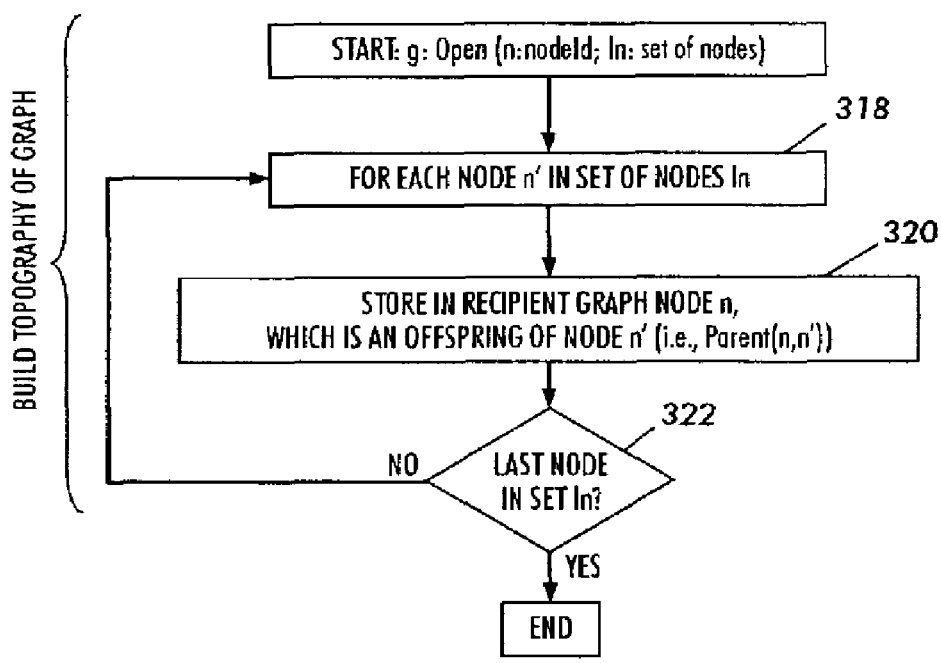
Figure 3D:
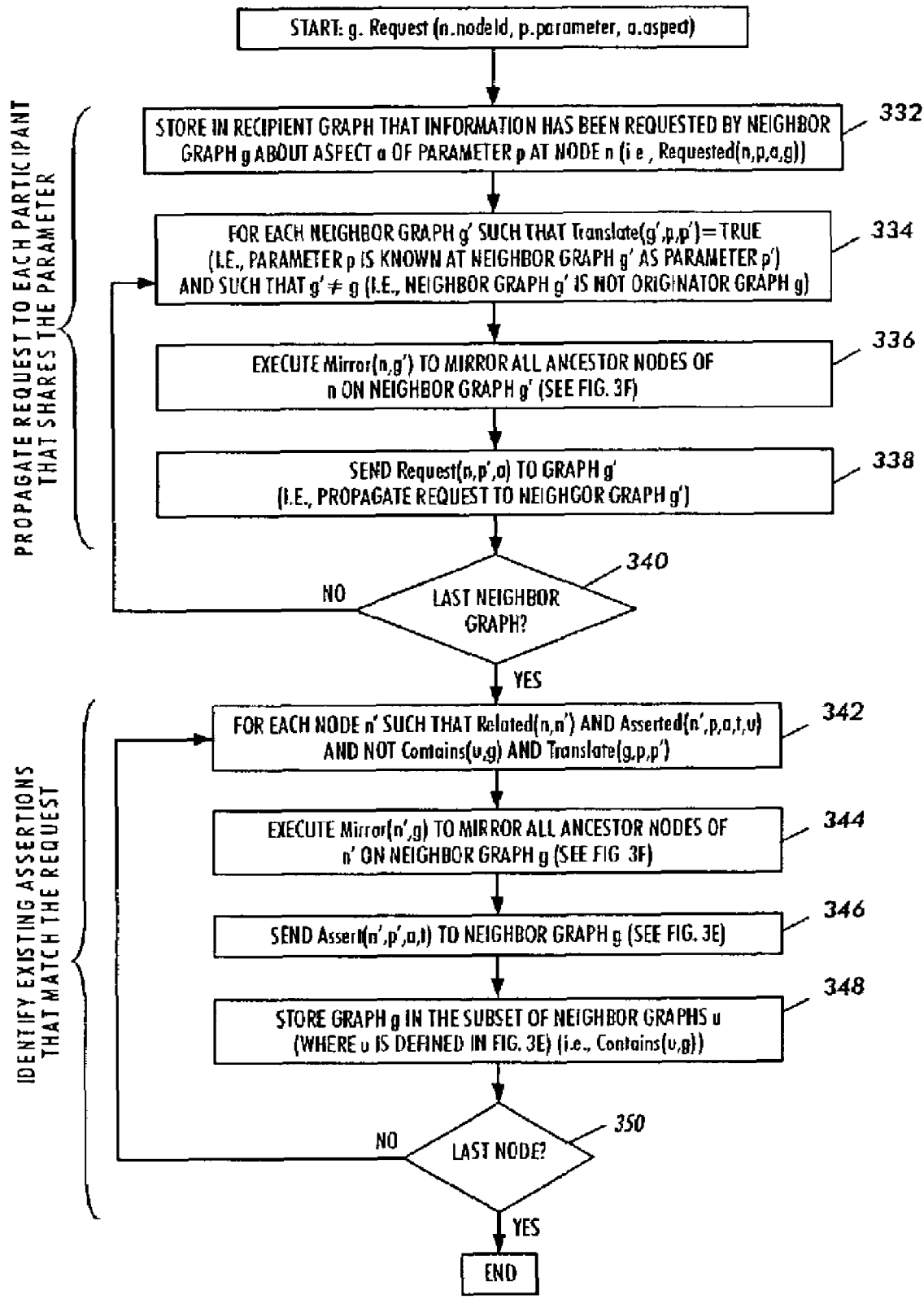
Figure 3E:
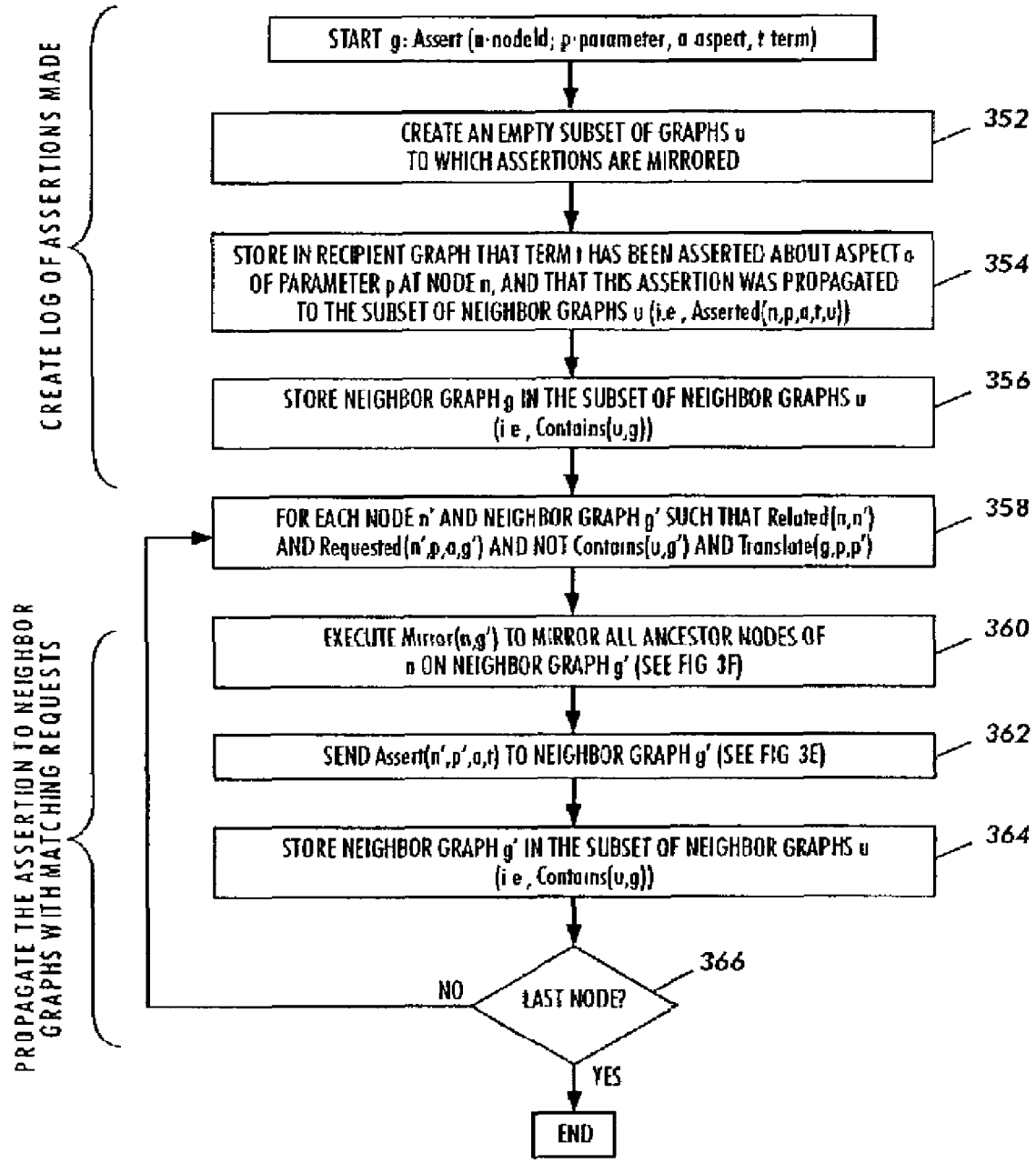
Figure 3F:
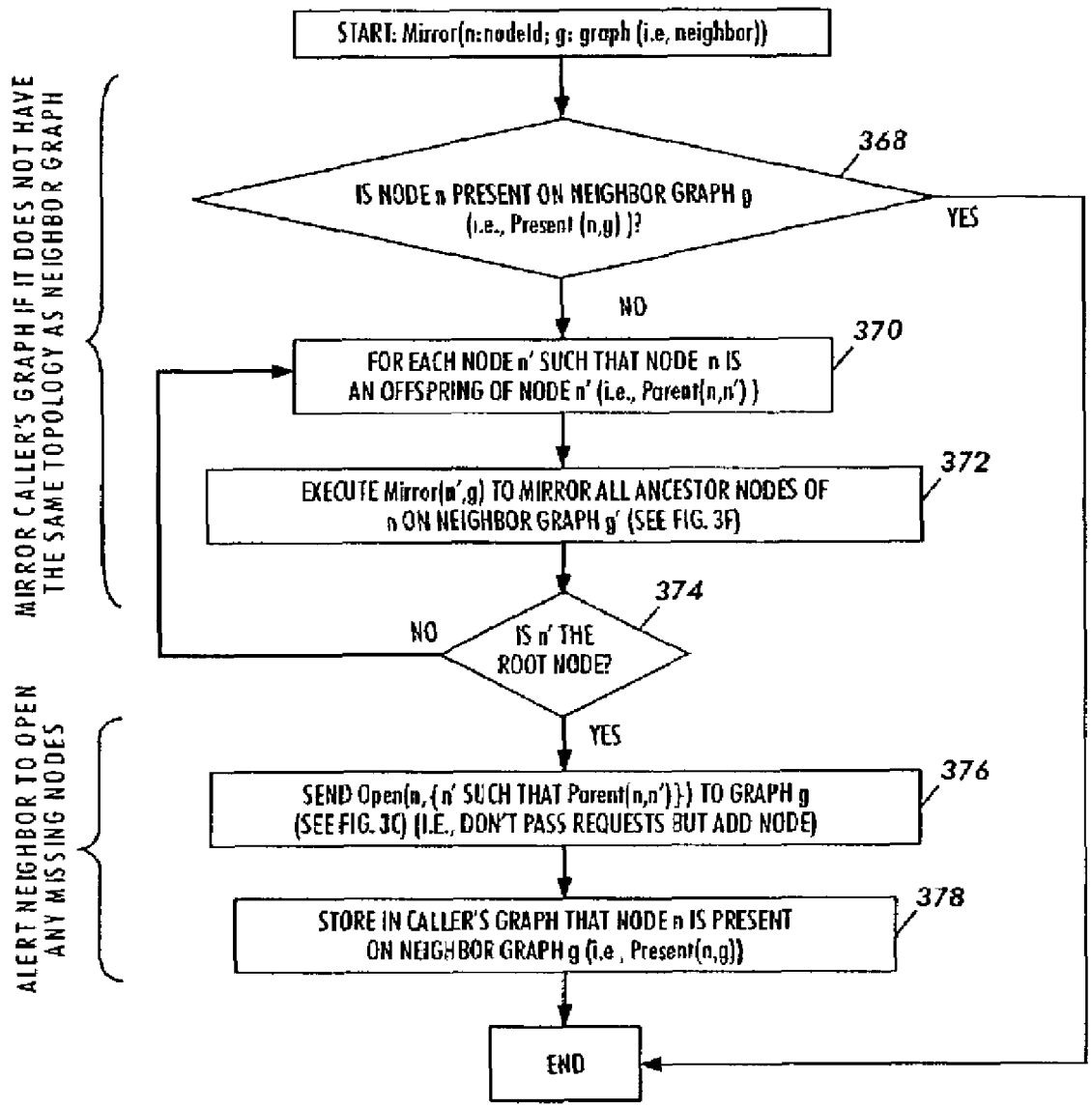

FIGS. 3A-3F set forth flow diagrams for performing partial mirroring of negotiation graphs in accordance with one embodiment of the present invention. Generally, the FIGS. 3B, 3C, 3D, and 3E correspond, respectively, to the acts performed when the primitives Connect( ), Open( ), Request( ), and Assert( ) are sent from one participant or coordinator to another participant or coordinator. FIGS. 3A and 3F identify internal operations that are performed by a coordinator or a participant.

Generally, the flow diagrams set forth in FIGS. 3A-3F, assumes that each negotiation graph (or graph), corresponding to one service invocation in a negotiation, is managed by a separate set of computational threads. The flow diagrams describe the sequence of operations to be performed after receiving a primitive of the negotiation protocol. In addition, the flow diagrams assume the elements set forth in Table 1 are stored in each graph. These elements are given in relational form (i.e., stating that it is stored, not how it is stored).

TABLE 1

| Relation | Meaning |
| --- | --- |
| Requested (n, a, p, g) | Information has been requested about aspect a of parameter p at node n, and this request was propagated by neighbor graph g. |
| Asserted (n, p, a, t, u) | Term t has been asserted about aspect a of parameter p at node n, and this assert was propagated to the subset of neighbor graphs u. |
| Contains (u, g) | Graph g belongs to the subset of neighbor graphs u. |
| Translate (g, p, p') | Parameter p is known at neighbor graph g as parameter p'. |
| Parent (n, n') | Node n is an offspring of node n'. |
| Present (n, g) | The topology of the graph, at node n and all its ancestors, is present on neighbor graph g. |

In addition, the relation Related(n,n') is equal or connected by a path in the Parent ( ) relation in Table 1 (i.e., n' is a descendant or an ascendant of node n in the graph). Also, sender-side calls of the execution of the operations defined in the flow diagrams are asynchronous. On the recipient-side, calls of the execution of operations defined in the flow diagrams are processed sequentially. That is, operations in no two flowcharts are executed simultaneously within the same negotiation graph, and messages are executed in the order that they are received. That is, if two messages are sent by a sender in a given order, the order in which those messages are executed is respected. However, operations in the flowcharts executed for different negotiation graphs may execute simultaneously.

For clarity some recurring operations in the flow diagrams are captured in sub-flow diagrams shown in FIGS. 3A (i.e., Init( )) and 3F (i.e., Mirror( )). These calls are performed synchronously (i.e., the caller is interrupted until the callee has completed). Init( ) shown in FIG. 3A describes actions performed internally by a coordinator 102 when a negotiation is initialized. That is, Init(n, g, tt) initializes a neighbor graph g for mirroring, controlled by the conversion table tt (defined by a set of pairs of parameters), and mirrors initial node n. Each negotiation graph is only initialized once for each negotiation.

More specifically as shown in FIG. 3A, Init( ) begins by mirroring initial node n (at 302). Subsequently, for each related node n' of node n such that (a) a neighbor graph g' has made a request on a given aspect a of a given parameter p and (b) the pair (p,p') is in tt (i.e. the conversion table) (at 304 and 310): (1) mirror node n' on neighbor graph g (at 306) and (2) propagate the request for information to neighbor graph g (at 308). For each parameter pair (p,p') in the set tt (i.e., the conversion table) (at 312 and 316), the parameter p known at neighbor graph g as parameter p' is stored in the coordinator's conversion table (at 314). The connect( ) primitive (described below with reference to FIG. 3B) is then sent to neighbor graph g (at 318).

FIG. 3B sets forth actions performed by a participant or coordinator upon receiving the Connect( ) primitive. For each pair of parameters (p,p') in the set tt received from the sender, the recipient stores the parameter p', known at the sender neighbor graph as parameter p, in the recipients conversion table (at 312, 314, and 316).

FIG. 3C sets forth the actions performed by a participant or coordinator upon receiving the Open( ) primitive. Initially, for each node n' in the set of nodes ln, the recipient stores in its negotiation graph the node n, which is an offspring of the node n' (at 318, 320, and 322). These acts effectively build the topology of a negotiation graph at a neighbor.

FIG. 3D sets forth the actions performed by a participant or coordinator upon receiving the Request( ) primitive. Initially, the recipient of the primitive stores in its negotiation graph that information has been requested by the neighbor graph g about aspect a of parameter p at node n (at 332). Subsequently, for each neighbor graph g' that (a) is not the graph g from which the primitive was sent and (b) has a parameter p known at the neighbor graph as p' (at 334 and 340), (1) the information is mirrored to all ancestor nodes of n on neighbor graph g' (at 336), and (2) the request for the information is propagated to neighbor graph g' (at 338).

Once the request from neighbor graph n is propagated to each participant or coordinator that shared the parameter (at 332, 334, 336, 338, and 340), all existing assertions that match the request are identified and mirrored to neighboring graph g (at 342, 344, 346, 348, and 350). More specifically, for each node n' that (a) is related to node n, (b) is asserted by a neighboring graph, (c) was not already asserted to the neighboring graph g, and (d) corresponds to parameter p' (at 342 and 350), then (1) the information is mirrored to all ancestor nodes of n' on neighbor graph g (at 344), and (2) the assertion is propagated to the neighbor graph g (at 346), and (3) the neighbor graph g is stored in the subset of graphs u (discussed in more detail below with regard to FIG. 3E) (at 348).

FIG. 3E sets forth the actions performed by a participant or coordinator upon receiving the Assert( ) primitive. Initially, an empty set of graphs u is created for recording those neighbor graphs to which assertions are mirrored (at 352). The recipient then stores in its negotiation graph that term t has been asserted about aspect a of parameter p at node n, and that this assertion was propagated to the subset of neighbor graphs u (at 354). Subsequently, the neighbor graph g is stored in the subset of neighbor graphs u (at 356).

Finally, the assertion that is received is passed to neighbor graphs that did not pass the assertion with matching requests. More specifically, for each node n' and neighbor graph g' such that: (a) the node n' is related to node n of neighbor graph g, (b) information about has been requested by neighbor graph g', (c) the neighbor graph g' is not in the subset of graphs u, and (d) the parameter p of neighbor graph g is the same as the parameter p' (at 358 and 366): all the ancestors nodes of n are then mirrored to the neighbor graph g' (at 360); an assertion to the neighbor graph concerning the parameter, aspect, and term (at 362); and the neighbor graph n' is stored in the subset of neighbor graphs u (at 364).

FIG. 3F sets forth the actions performed internally by a participant or coordinator when a mirror operation (i.e., "EXECUTE Mirror( )") is caused to be performed either during initialization of the negotiation at 302 and 306 in FIG. 3A, or at 336 and 344 in FIG. 3D or at 360 in FIG. 3E as a result of receiving a Request( ) or Assert( ) primitive, respectively. Generally, the Mirror(n,g) operation mirrors at neighborhood graph g, the topology of the local graph up to node n (i.e., the subset of the Parent relation obtained by starting at n and following the edges of that relation recursively).

As shown in FIG. 3F, initially a determination is made as to whether a node is present on the graph g of the caller of mirror( ). If it is already present then there is nothing to mirror; otherwise, for each node n' such that node n is an offspring of node n' (at 370 and 374), the call to mirror is recursively called again until the root node is reached (at 372). Then a message is sent to the participant or coordinator of graph g simply to open the node n (at 376). Finally, the caller stores in its graph that node n is present on neighbor graph g.

The primitives Ready( ) and Quit( ), which are not shown in the FIGS. 3A-3F may be summarized operationally as follows. When Quit(n:nodeId) is sent from one participant or coordinator to another participant or coordinator, the sender is giving up on a particular aspect (identified at the node) of a negotiation. This has the effect on a negotiation graph of removing all nodes that are children of the identified node, as well as, propagating this information to neighbors who know about the node(s).

When Ready(n:nodeId) is sent from one participant or coordinator to another participant or coordinator, the sender is specifying that from the identified node, the sender is ready to accept the negotiated terms as they have been negotiated up to that point. Impliedly, the sender of Ready( ) will be willing to accept terms that are further negotiated beyond the identified node since consensus is given to the most advance node in a negotiation (i.e., node furthers away from the root node). The coordinator ultimately decides what combination of participants are ready and whether a negotiation has concluded.

E. Negotiation Operation

Figure 4:
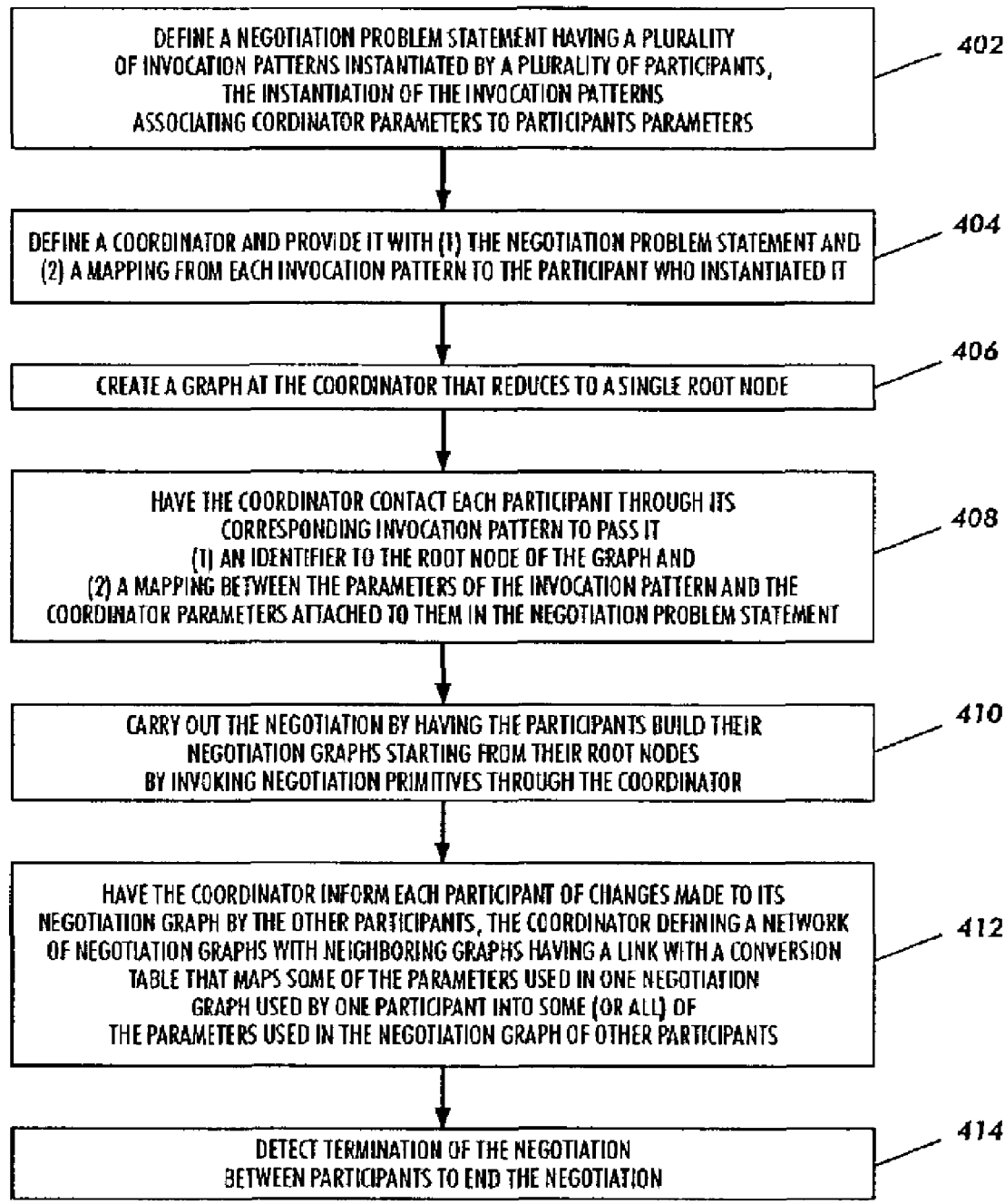
FIG. 4 illustrates a flow diagram for performing a negotiation using the framework set forth above for collaboratively constructing a negotiation graph.

FIG. 4 illustrates a flow diagram for performing a negotiation using the framework set forth above for collaboratively constructing a negotiation graph. The negotiation begins at 402 by defining a negotiation problem statement as defined above. At 404, the coordinator 102 is given the negotiation problem statement and a mapping from each invocation pattern 110 in the problem statement to a participant 106 that instantiates it as an invocation 118. Alternatively, this mapping could be obtained from a name server 120, shown in FIG. 1.

At 406, the coordinator 102 then creates a negotiation graph 108 that is reduced to a single (root) node. At 408, the coordinator 102 contacts each participant 106 in the negotiation through its corresponding invocation pattern 110, and passes it (1) an identifier of the root node, and (2) a mapping between the parameters of the participant invocation pattern 110 and its own parameters 112 which are attached to them in the negotiation problem statement defined at 402.

At 410, the participants 106 carry out the negotiation by building their negotiation graphs 108 starting from their root node (passed by the coordinator 102 at 408) by invoking negotiation primitives 116 as defined above through the coordinator 408. In response to receiving messages of negotiation primitives invoked by the participants at 410, the coordinator 102 informs each participant of changes made to its negotiation graph by other participants 106 at 412.

In informing the other participants at 412, the coordinator defines a network of negotiation graphs with neighboring graphs having a link with a conversion table that maps some of the parameter names used in a negotiation graph by one participant into some (or all) of the parameter names used in the negotiation graphs of other participants. At 414, the end of the negotiation between the participants is detected. Participants may indicate agreement or desire to discontinue a negotiation using the negotiation primitives Ready( ) and Quit( ), respectively, that are described above.

F. Example Commercial Negotiation

Figure 5:
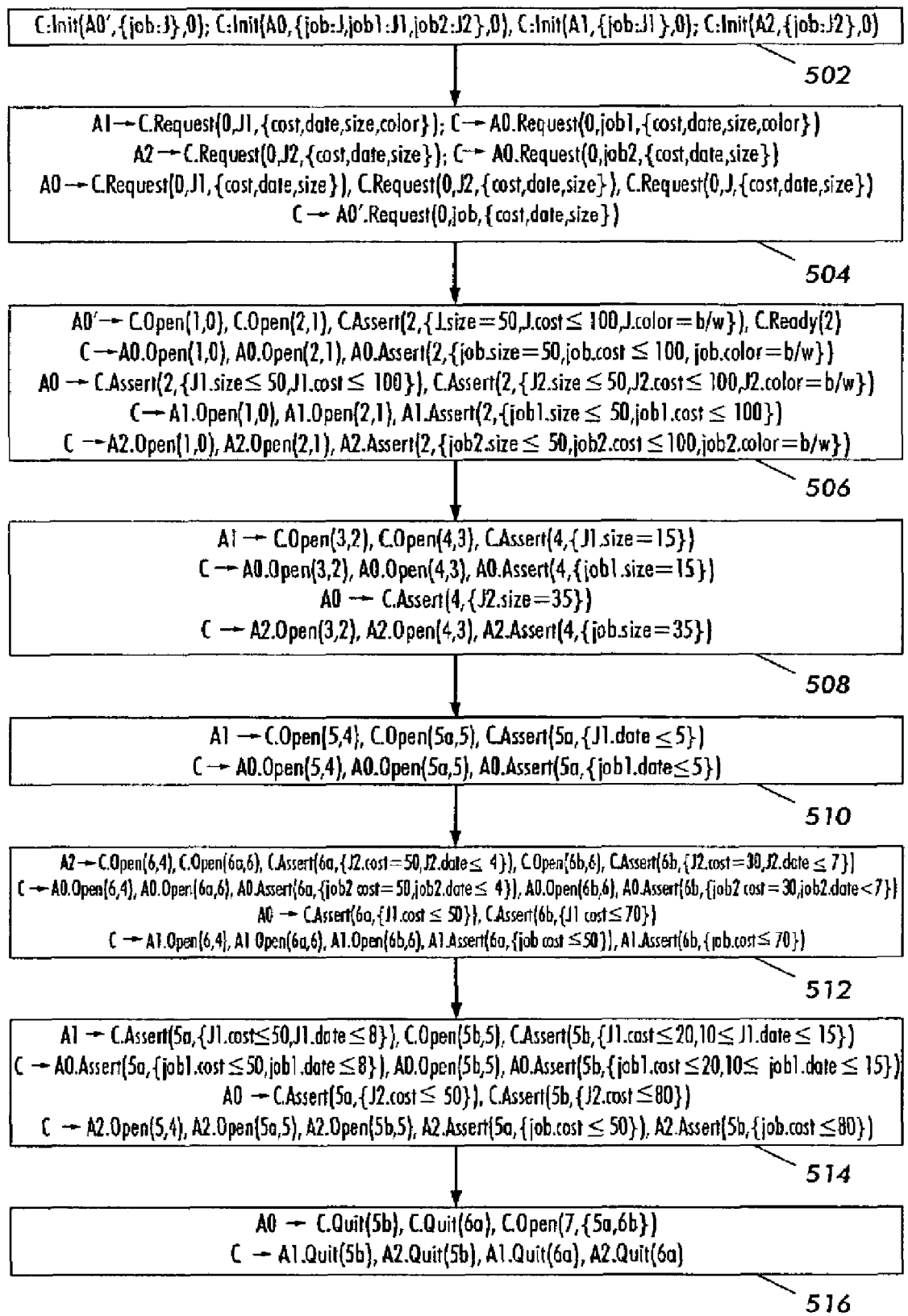
FIG. 5 is a detailed trace of an example negotiation.
Figure 6:
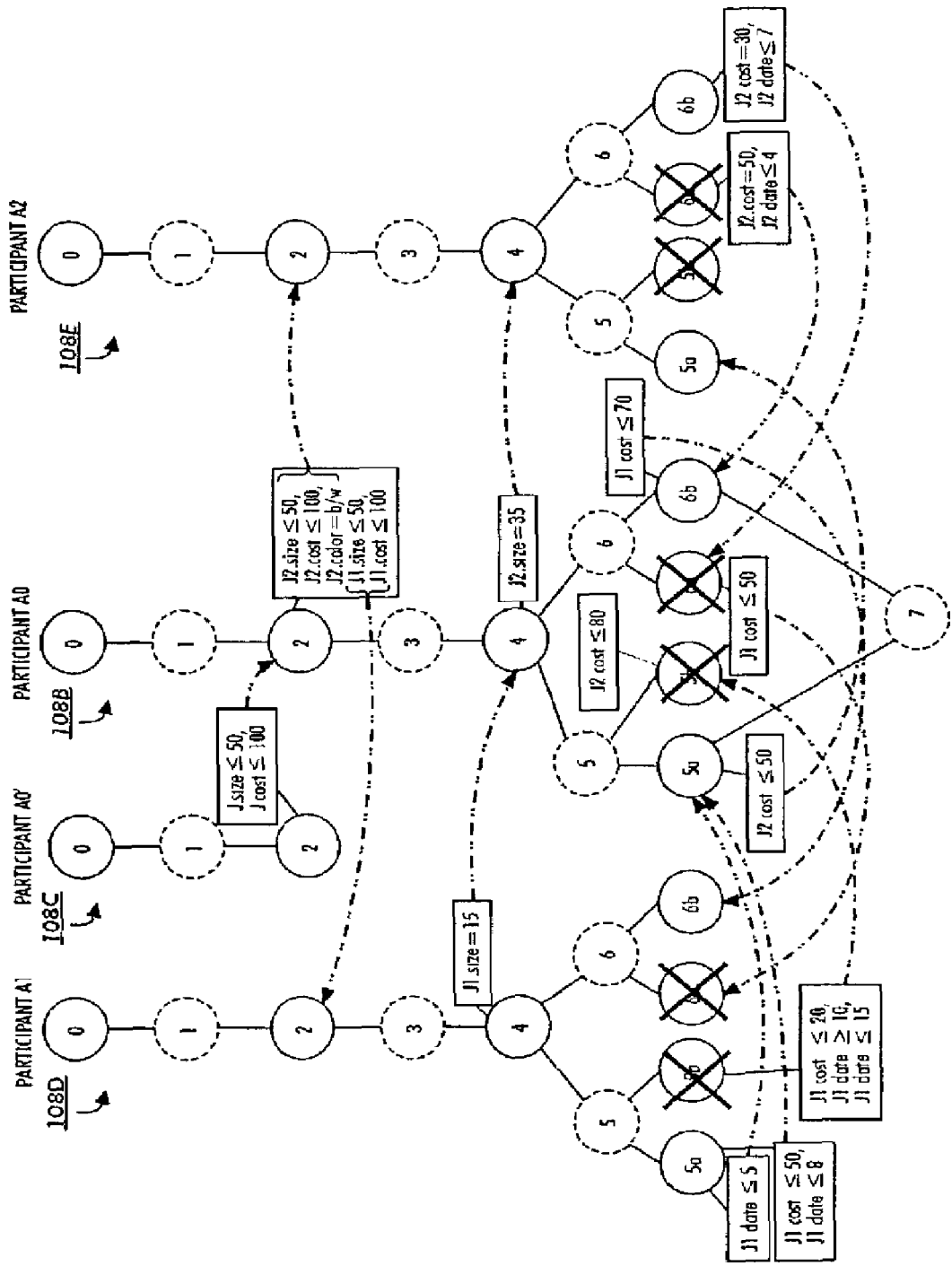
FIG. 6 illustrates the evolution of negotiation graphs of the participants carrying out the negotiation traced in FIG. 5.
Figure 7:
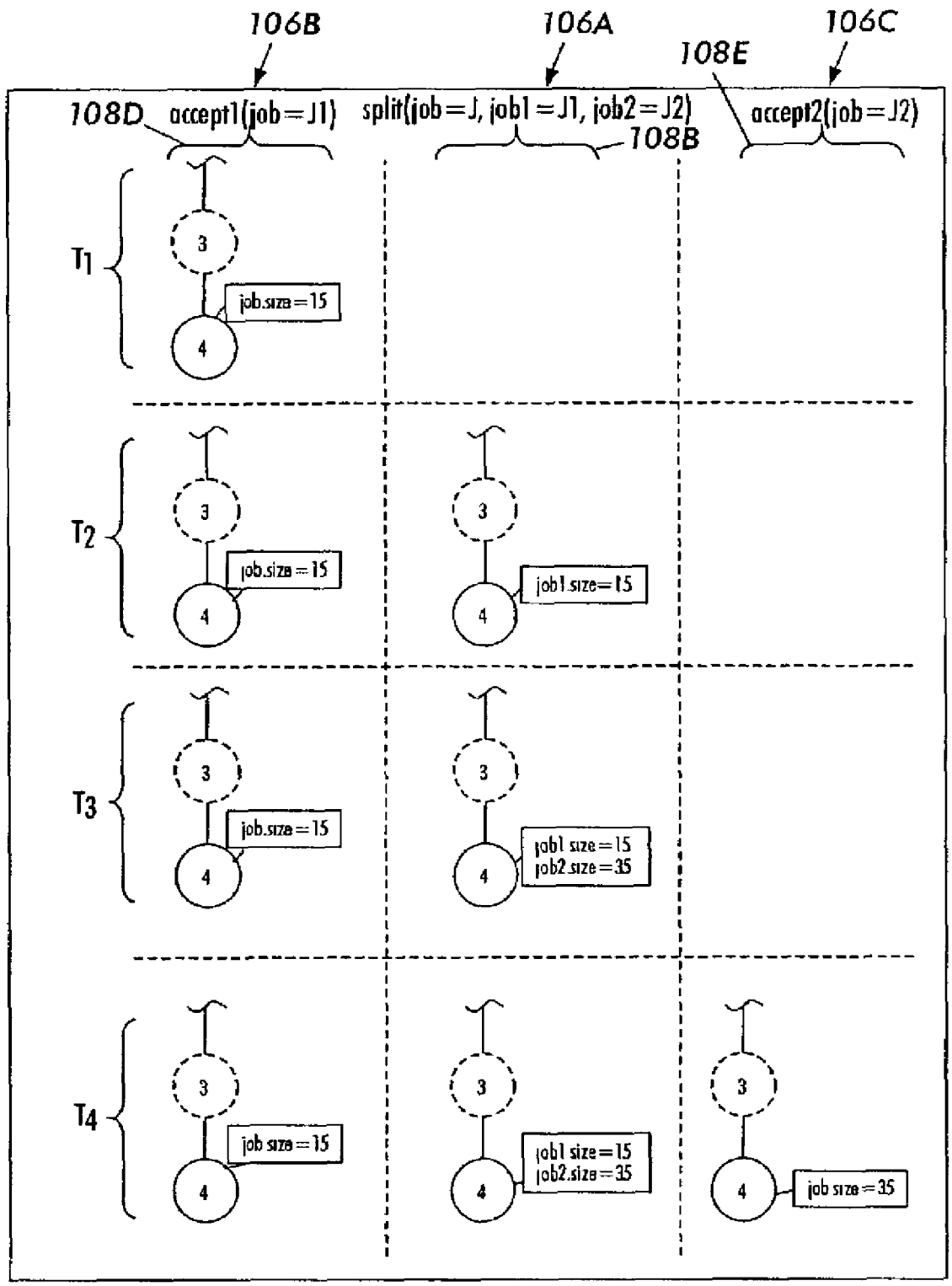
FIG. 7 details the formation of the nodes 3 and 4 in the graphs of each participant for the evolution of the negotiation graphs shown in FIG. 6.

FIGS. 5, 6, and 7 illustrate an example negotiation carried out using the framework set forth above. FIG. 5 is a detailed trace of the example negotiation. FIG. 6 illustrates the evolution of negotiation graphs of the participants carrying out the negotiation traced in FIG. 5. FIG. 7 details the formation of the nodes 3 and 4 in the graphs of each participant for the evolution of the negotiation graphs shown in FIG. 6.

F.1 Setting Up The Problem Statement

The example negotiation involves an alliance of printshops in which each partner in the alliance has the ability to negotiate the outsourcing of print jobs, possibly split into multiple slots, to other partners in the alliance. As shown in FIG. 1, each printshop is represented as a participant 106. Each participant is a software agent that performs some actions related to outsourcing and/or insourcing that may possibly be under complete or partial human control. In the example shown in FIG. 1, a definition of the negotiation problem statement (as set forth at 402 in FIG. 4) is begun by first defining the invocation patterns 110 for each participant.

As shown in FIG. 1, the participant 106A offers two invocation patterns outsource(job) and split(job, job1, job2) and the participants 106B and 106C each offer one invocation pattern accept1(job) and accept2(job) respectively. Alternatively, all the invocations patterns could have been offered by a single "broker" participant (not shown), who acts as surrogate for different printshops registered in for example, the name server 120, and visible through an extra parameter in the invocation patterns.

In the invocation pattern outsource(job), "outsource" is the invocation name and "job" is the named parameter. Similarly, "split", "accept1", and "accept2" are invocation names and "job", "job1", and "job2" are named parameters, for their respective invocation patterns. For simplicity, the invocation names "outsource", "split", "accept1", and "accept2" are also referred to herein and in the Figures also as "A0'", "A0", "A1", and "A2", respectively.

The invocation pattern outsource job) denotes an action given by the participant (or printshop in this example) 106A of outsourcing a job named "job" in its entirety or in parts. The invocation pattern split(job, job1, job2) denotes an action given also by the participant 106A of splitting a job named "job" into two parts or slots "job1" and "job2". The invocation patterns accept1(job) and accept2(job) denote actions by the participants 106B and 106C, respectively, for accepting a job named job.

As set forth above, the actual invocations 118 are obtained by instantiating the invocation patterns 110 with coordinator parameters 112. In this example, the coordinator parameters 112 are "J", "J1", and "J2". The values of the coordinator parameters assigned to the participants parameters do not commit to any data representation format. Its aspects 114 in turn describe properties for each parameter. For example, a print job can be described by various aspects such as cost, size, date (i.e., deadline), and color (i.e., b/w or color). Each aspect can be defined as a term (e.g., cost<20) that denotes a property of the aspect (e.g., cost).

Once the invocations are defined for the participants, a problem statement can be defined for this example as: outsource job=J)@split(job=J, job1=J2, job2=J2)@accept1 (job=J1)@accept2(job=J2). As part of defining the problem statement, the meaning of aspects and terms are negotiated between the participants using well known protocols developed for example by World Wide Web Consortium (W3C). Generally, this problem statement provides that the negotiation should result in the printshop, corresponding to participant 106A, outsourcing a job split into two slots that are accepted by the printshops corresponding to the participants 106B and 106C.

More generally, the preceding problem statement is a formalized set of invocation patterns with parameter sharing constraints. The purpose of the negotiation is to agree upon an assignment of the parameters by values and of the invocation patterns 110 by actions to be performed by the participants 106, so that the assignments are consistent with the problem statement.

Thus in this example, the negotiation must produce: (A) an assignment of the coordinator parameters "J", "J1", "J2" to values "j", "$j_1$", "$j_2$", respectively; and (B) an assignment of the four invocation patterns of the problem statement to actions "a", "a'", "$a_1$", "$a_2$" respectively, that realize the invocations: (a) outsource(job) where job is assigned to "j"; (b) split(job, job1, job2) where "job", "job1", "job2", are assigned to "j", "$j_1$", "$j_2$" respectively; (c) accept1(job) where job is assigned to "$j_1$"; and (d) accept2(job) where job is assigned to "$j_2$".

Furthermore, the role of the coordinator parameters 112 in the negotiation problem statement is to capture interdependencies between the participant parameters of the invocation patterns 110 that are to be realized through actions by each participant. Capturing interdependencies by simple parameter sharing has the advantage that it can be understood without making any assumption on the structure and semantics of the shared values.

For example, in a problem statement: p(a=X)@q(b=X, c=Y), should the interdependency between parameter "a" in "p" and parameter "b" in "q" need a more complex representation, then the problem statement could be rewritten as: p(a=X')@q(b=X",c=Y)@r(u=X', v=X"). The addition of coordinator parameters X' and X" and the invocation pattern r(u,v), which captures an interdependency between X' and X", permits the exact meaning of any required interdependency between X' and X" to be encapsulated inside the participant offering the invocation pattern r(u,v). Accordingly, interdependency between coordinator parameters can be delegated in this manner to a participant that offers an invocation pattern encapsulating the interdependency.

F.2 Building The Negotiation Graph

As set forth in FIG. 1, the framework of the negotiation in this printshop includes four components: one coordinator 102A and three participants (or printshops) 106A, 106B, and 106C. The participant 106A offers in its interface with the coordinator 102A two invocation patters: outsource(job) and split(job, job1, job2), capturing the decision to outsource a job named "job" and split it into two slots named "job1" and "job2". The participants 106B and 106C offer, respectively, the invocation patterns accept1(job) and accept2(job), capturing their decision to accept to perform a job named "job".

After defining the negotiation problem statement (as set forth at 402 in FIG. 4), the coordinator 102A (i.e., "C") connects to each of the three participants 106A, 106B, and 106C (i.e., "A0+A0'", "A1" and "A2") with the corresponding parameter name conversion table as well as an identifier to the root node of a negotiation graph (as set forth at 404 and 406 in FIG. 4).

Subsequently, as described below, the participants use the negotiation primitives described above to collaboratively build a negotiation graph at the coordinator that is mirrored at each participant. Each path in the negotiation graph represents a dialog between the participants consisting of successive refinements of the terms of the negotiation. Having multiple paths in the negotiation graph allows several interwoven alternatives to be explored in parallel as shown in the example below.

As shown at 502 in FIG. 5, the coordinator begins with the internal execution of Init( ) as set forth in FIG. 3A. This act includes using the negotiation primitive Connect( ), where the coordinator accesses the participant 106A through its two invocations, split( ) and outsource( ), the participants 106B and 106C through their invocations accept1( ) and accept2( ), where A0', A0, A1, and A2 represent the invocation names outsource, split, accept1, and accept2, respectively. (e.g., C→A0'.Connect(0,{job:j}), A0.Connect(0,{job:J,job1:J1, job2:J2}), A1.Connect(0,{job:J1}), A2.Connect(0,{job: J2})).

After completing 502, each participant has one negotiation graph per invocation pattern instantiated. Accordingly in this example, the participant 106A has two negotiation graphs 108B and 108C, and the participants 106B and 106C have negotiation graphs 108D and 108E, respectively. The negotiation graphs for each participant are shown in detail in FIG. 6. After 502, only the node 0 (or the root node) exists for each graph.

In addition after 502, the coordinator 102A also has a negotiation graph 108A, as shown in FIG. 1, that links with the four negotiation graphs 108B-108E through the four neighborhood links 122, 123, 124, and 125. Each link 122-125 is labeled with a conversion table, (i.e., {job:J; job1:J1, job2:J2}, {job:J}, {job:J1}, {job:J2}, respectively. Consequently, any information pertaining to J2 in the coordinator's negotiation graph 108A will not be mirrored to the participant 106B, since J2 does not occur in the conversion table of its neighborhood link.

Although the negotiation graph 108A of the coordinator 102A is not shown, those skilled in the art will appreciate that it will appear very similar to the graph 108B of participant 106A since the invocation contains all parameters of the other invocations. Also for simplicity, the graphs shown in FIG. 5 are all labeled using the parameter names of the coordinator. Converting to the corresponding parameter names of the invocations can be done using the conversion tables 104 for each participant.

At 504, the participants 106A, 106B, and 106C express their interest in receiving information about various aspects of the jobs, by sending messages through the coordinator 102A using the negotiation primitive Request( ).

Initially at 506, the participant 106A with its invocation "outsource" uses the negotiation primitive Assert( ) to specify some properties on the size and cost of a job, which have been requested by its invocation "split". In particular, the aspect "size" is assigned the value 50 and the aspect "cost" is assigned a value not to exceed 100. This is shown at nodes 1 and 2 of the negotiation graph 108C in FIG. 6.

Subsequently at 506, the invocation "split" of the participant 106A is then able to infer some properties on the aspects "cost" and "size" of each of the slots "job1" and "job2" from the corresponding properties of the global job. In particular, the invocation "split" of the participant 106A uses the negotiation primitive Assert( ) to specify for both of the participants 106B and 106C that the size of their jobs should not exceed 50 and the cost 100. This is shown at nodes 1 and 2 at the negotiation graph 108B shown in FIG. 6.

Finally at 506, the coordinator ("C") propagates this information to the participants who have expressed an interest in it. More precisely, the coordinator informs the participant 106B about the cost and size of J1 and participant 106C about the cost and size of J2. These acts result in the formation of the nodes 1 (decision point) and nodes 2 (negotiation context) in each of the negotiation graphs 108D and 108E, respectively, as shown in FIG. 6.

At 508, the participant 106B further constrains J1 by fixing its size to 115. The coordinator then propagates this information to the "split" invocation of the participant 106A. The "split" invocation of the participant 106A is then able to infer the size for J2 (i.e., 35), since the total size of j has been constrained to 50. The coordinator then propagates the information about the size of J2 to the participant 106C. These acts are shown at nodes 3 and 4 in the negotiation graphs 108B, 108D, and 108E in FIG. 6.

At 510, the participant 106B refines the proposal on J1 by constraining the delivery date to less than 5 days. The coordinator propagates this information to the "split" invocation of the participant 106A. These acts are shown at nodes 5 and 5a in the negotiation graphs 108D and 108B in FIG. 5.

At 512, the participant 106C makes two alternative proposals on J2. In the first proposal the delivery date is constrained to less than 4 days and the price is set at 50. In the second proposal, the delivery date is constrained to less than 7 days but the price is set at 30. The coordinator propagates the two proposals to the invocation "split" of the participant 106A, which is then able to infer some information on J1 in both proposals. In the first proposal the cost for J1 should not exceed 50, while in the second proposal the cost should not exceed 70. The coordinator then propagates this information to the participant 106B, mirroring the part of the graph that was missing. These acts are shown at nodes 6, 6a, and 6b in the negotiation graphs 108B, 108D, and 108E in FIG. 6.

At 514, the participant 106B refines its own proposal on J1 bounding the price to 50 and the deadline to 8. It also makes a new alternative proposal for performing J1 at a lower cost

(20) but with an easier deadline (between 10 and 15 days.) The coordinator then propagates to the invocation "split" of the participant 106A the refinement of the first proposal and the new proposal. The invocation "split" of the participant 106A is then able to infer some information on J2 in both proposals. In the first proposal the cost for J2 should not exceed 50, while in the second proposal the cost should not exceed 80. The coordinator then propagates this information to the participant 106C. These acts are shown at nodes 5, 5*a*, and 5*b* in the negotiation graphs 108B, 108D, and 108E in FIG. 6.

At 516, the invocation "split" of the participant 106A selects two options (5*a* and 6*b*) to create a new negotiation context (node 7) for further refining and rejects the other options (5*b* and 6*a*). The new negotiation context at node 7 merges constraints on both jobs J1 to be performed by the participant 106B (e.g., size=15, 10≦date≦15, cost≦20) and J2 to be performed by the participant 106C (e.g., size=35, date≦7, cost=30). The coordinator then informs the participants 106B and 106C about the rejected options. These acts are shown at nodes 5*b*, 6*a* and 7 in the negotiation graphs 108B, 108D, and 108E in FIG. 6, where rejected nodes are shown with an "X" through them.

F.3 Mirroring Example

FIG. 7 illustrate a detailed example of mirroring relating to the example shown in FIGS. 5 and 6. Specifically, this detailed example concerns the sequence of events that occur at 508 in FIG. 5 and nodes 2 and 3 in FIG. 6.

Initially, the invocation "accept1.{Open(3,2), Open(4,3), Assert(4,{job.size=15})}" of the participant 106B creates a decision node 3 with alternatives from negotiation context 2. It then creates one alternative 4 for decision 3 and asserts a size constraint on the job it wishes to accept in this alternative. All these operations are initiated by the participant 106B through its invocation accept1, according to its own specific semantics (characterizing, here, its strategy in accepting jobs). The resulting graph segment for negotiation graph 108D of participant 106B is depicted at $T_1$ in FIG. 7.

The coordinator had previously informed the participant 106B that the size aspect of its job parameter was requested in the negotiation context node 2 (or one of its ancestors). The participant 106B therefore forwards to the coordinator the information it has just asserted on that aspect at the negotiation context node 4. Since the coordinator does not know this context yet, the participant 106B mirrors the missing nodes of the graph (nodes 3 and 4) into the coordinator. Note that the parameter name job known by the participant 106B is converted into the corresponding coordinator parameter name j known by the coordinator.

Subsequently, the coordinator looks for all the participants that requested information on the size of J1 in the negotiation. In this example, only the participant 106A is interested through its "split" invocation. The coordinator therefore passes the information to the "split" invocation of the participant 106A. Again, nodes 3 and 4 of the graph 108B, which did not previously exist for the graph of the "split" invocation, are first mirrored by the coordinator to the participant 106A. And again, the coordinator parameter name J1 is converted (using the conversion table 122) into the corresponding parameter name job1 in the "split" invocation. The resulting graph segment for negotiation graph 108B of participant 106A is depicted at $T_2$ in FIG. 7.

The "split" invocation of the participant 106A had previously been informed that the total size of its job had been constrained to be equal to 50 in context 2 (or one of its ancestors). The constraint therefore holds in context 4 since it is a descendent of context 2. Furthermore, knowing that in context 4 the size of slot job1 is constrained to be equal to 15, the "split" invocation infers that the size of the other slot job2 is constrained to be equal to 35 in that context. This constraint propagation, which is here a characteristic of the semantics of the invocation "split" (and is therefore not initiated by the infrastructure) can either be automatic, made by a program attached to the invocation, or manual (i.e., made through some user interface). The resulting graph segment for negotiation graph 108B of participant 106A is depicted at $T_3$ in FIG. 7.

Since the size of job2 had also been requested in the negotiation by the participant 106C, the "split" invocation of the participant 106A forwards to the coordinator the information it has just asserted on that aspect at $T_3$. Again, the parameter name job2 is converted into its corresponding coordinator parameter name J2 when the assertion is forwarded to the coordinator. The coordinator then passes on the information it has just received on the size of J2 to the invocation accept2 (of participant 106C) which had previously requested it. The coordinator parameter name J2 is converted again into the parameter name job. The resulting graph segment for negotiation graph 108E of participant 106C is depicted at $T_4$ in FIG. 7.

Further background of this negotiation scenario is described by J-M. Andreoli, S. Castellani, and M. Munier, in "AllianceNet: Information Sharing, Negotiation and Decision-Making for Distributed Organizations", published inn Proc. of EcWeb2000, Greenwich, U.K., 2000, which is incorporated herein by reference. In addition, it will be appreciated by those skilled in the art that the scope of the negotiation method described herein extends beyond this operating example. Instead, the negotiation method described herein is applicable in other domains that involve computational objects that are capable of making autonomous decisions. Such computational agents could require explicit or implicit human guidance through, for example, a user interface.

G. Miscellaneous

As described above, a negotiation method based on a multi-directional paradigm is described that allows flexible refinement of negotiation terms. The negotiation method is intentionally independent of any application domain, thus qualifying as foundation for a true middleware service. In addition, the negotiation method advantageously enables exploration of alternative paths leading to potentially different agreements which may or may not be exclusive.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

It will be appreciated that various other alternatives, modifications, variations, improvements or other such equivalents of the teachings herein that may be presently unforeseen, unappreciated or subsequently made by others are also intended to be encompassed by the following claims.

The invention claimed is:

1. A method for carrying out a negotiation between a plurality of participants, comprising:
defining an invocation pattern for each participant; each invocation pattern being a tuple having at least a name and a set of parameters;
attaching a set of coordinator parameters to each invocation pattern; the set of coordinator parameters defining interdependencies between parameters of the plurality of participants that are shared across their invocation patterns;
constructing a graph to negotiate a set of actions to be performed by selected ones of the plurality of participants; the graph being constructed with nodes of one of a first node type representing a negotiating context and a second node type representing a decision point;
wherein the graph is constructed by the participants with primitives instantiated by the invocation patterns that are used to negotiate values of parameters; and
wherein at least one node in the graph is a decision point that merges two or more negotiation contexts into a single decision point; the single decision point combining values of the parameters from the two or more negotiation contexts.

2. The method according to claim 1, wherein properties of each parameter are defined by a set of one or more aspects, with each aspect having a constraint.

3. The method according to claim 1, wherein each negotiating context is associated with a parameter and a term describing an aspect of the value of the parameter in the invocation pattern.

4. The method according to claim 1, wherein each decision point in the graph has one or more parent nodes that must all be negotiation contexts.

5. The method according to claim 4, wherein each negotiation context in the graph has one or no parent node that must be a decision point.

6. The method according to claim 5, wherein the negotiation context with no parent node is a root node that is not the result of a decision.

7. The method according to claim 4, wherein each decision point is a hyper-arc.

8. The method according to claim 1, wherein the primitives define a protocol for collaboratively building a graph at each participant.

9. The method according to claim 8, wherein the graph built at each participant contains only properties of parameters in its invocation pattern.

10. The method according to claim 1, wherein each negotiation context in the graph is labeled with one or more pairs of: an aspect on a parameter, and a property constraining the aspect's value.

11. A system for carrying out a negotiation between a plurality of participants, comprising:
having a processor;
means for defining an invocation pattern for each participant; each invocation pattern being a tuple having at least a name and a set of parameters;
means for attaching a set of coordinator parameters to each invocation pattern;
the set of coordinator parameters defining interdependencies between parameters of the plurality of participants that are shared across their invocation patterns;
means for constructing a graph to negotiate a set of actions to be performed by selected ones of the plurality of participants; the graph being constructed with nodes of one of a first node type representing a negotiating context and a second node type representing a decision point;
wherein the graph is constructed by the participants with primitives instantiated by the invocation patterns that are used to negotiate values of parameters; and wherein at least one node in the graph is a decision point that merges two or more negotiation contexts into a single decision point; the single decision point combining values of the parameters from the two or more negotiation contexts.

12. The system according to claim 11, wherein properties of each parameter are defined by a set of one or more aspects, with each aspect having a constraint.

13. The system according to claim 11, wherein each negotiating context is associated with a parameter and a term describing an aspect of the value of the parameter in the invocation pattern.

14. The system according to claim 11, wherein each decision point in the graph has one or more parent nodes that must all be negotiation contexts.

15. The system according to claim 14, wherein each negotiation context in the graph has one or no parent node that must be a decision point.

16. The system according to claim 15, wherein the negotiation context with no parent node is a root node that is not the result of a decision.

17. The system according to claim 14, wherein each decision point is a hyper-arc.

18. The system according to claim 11, wherein the primitives define a protocol for collaboratively building a graph at each participant.

19. The system according to claim 18, wherein the graph built at each participant contains only properties of parameters in its invocation pattern.

20. The system according to claim 11, wherein each negotiation context in the graph is labeled with one or more pairs of: an aspect on a parameter, and a property constraining the aspect's value.

* * * * *